United States Patent
Edwards

[15] 3,673,110
[45] June 27, 1972

[54] SURFACE-MODIFIED CELLULOSE
[72] Inventor: James B. Edwards, Cincinnati, Ohio
[73] Assignee: The Proctor & Gamble Company, Cincinnati, Ohio
[22] Filed: Dec. 28, 1970
[21] Appl. No.: 102,199

[52] U.S. Cl..............................252/427, 8/116.2, 252/89, 252/90
[51] Int. Cl. .....................................C11d 17/00
[58] Field of Search ...................252/89, 90, 427; 8/116.2

[56] References Cited

UNITED STATES PATENTS

| | | | |
|---|---|---|---|
| 1,777,459 | 10/1930 | Baddiley et al. | 252/427 X |
| 2,179,591 | 11/1939 | Godchaux | 252/427 X |
| 2,687,990 | 8/1954 | Weisz | 252/427 X |
| 3,393,968 | 7/1968 | Segal | 8/116.2 |

*Primary Examiner*—Patrick P. Garvin
*Attorney*—Jack D. Schaeffer and Richard C. Witte

[57] ABSTRACT

An adsorbent mass useful in adsorbing dirt and anionic dye molecules in laundering operations and the like is prepared by modifying a cellulosic substrate to render same anionic and thereafter coating the modified surface with certain nitrogen compounds.

12 Claims, No Drawings

SURFACE-MODIFIED CELLULOSE

BACKGROUND OF THE INVENTION

This invention relates to an adsorbent mass comprising a cellulosic substrate coated with certain nitrogen containing compounds. Cellulosic substrates, when so modified, are useful by virtue of their ability to adsorb various anionic materials from aqueous solutions. For example, the surface-modified cellulosic materials prepared in accordance with this invention can be used as chromatography supports and as filtration aids. Likewise, these materials can be used as dirt and anionic dye attractants in laundering operations as disclosed in the concurrently filed application of James B. Edwards entitled "Laundering Aid," Ser. No. 102,200, filed Dec. 28, 1970.

A variety of surface-modified cellulosic materials have been described in the prior art. For example, U.S. Pat. No. 3,424,545, Jan. 28, 1969, to R. A. Bauman, discloses a cellulosic cloth having a phosphorylated surface which is suitable for use as a cation exchange material. Hoffpauir, et al., *Textile Research J.*, 20, 617 (1950) describe a cellulosic material having quaternary nitrogen substituents. British Pat. No. 824,191, to Farbenfabriken Bayer Aktiengesellschaft, published Nov. 25, 1955, discloses a cellulosic material with polyethylenimine adsorbed on its surface, said material functioning as an inorganic anion exchanger. Similarly, U.S. Pat. No. 3,393,968, July 23, 1968, to L. Segal, discloses cellulosic fabrics treated with ethylenimine in the presence of glacial acetic acid and their utility as ion exchange and complex forming materials. U.S. Pat. No. 3,233,962, Feb. 8, 1966, to George R. Nelson, discloses paper and fabrics modified to increase their wet strength by the adsorption of polyamide resins thereon. It may therefore be seen that cellulosic materials, of one type or another, have been subjected to various surface modifications with a view towards rendering same adsorptive of cations and anions, increasing the strength of the material, etc.

By the present invention, the surfaces of various water-insoluble cellulosic substrates, such as cotton, in the form of particles, fibers and fabrics, are first rendered anionic by an appropriate treatment and then an organic nitrogen compound of the type hereinafter detailed is attached thereto by the interaction between the anionic group and said nitrogen compound. By this procedure, the substrate is provided with a surface coated with an organic nitrogen compound which is not removed by contact with water, said coated surface being adsorptive to various anionic materials when contacted with aqueous solutions or suspensions thereof. The resulting surface modified materials find utility as hereinbefore disclosed.

Accordingly, it is a primary object of the present invention to provide an adsorbent mass having an anionic surface on which is affixed various nitrogen compounds of the type hereinafter disclosed which are retained on the surface when in contact with aqueous solutions. Another object is to provide a process for modifying the surface of various cellulosic materials, especially cotton, by first rendering the surface of said cellulosic material anionic and then chemically affixing thereto an organic nitrogen compound. These and other objects are obtained by the present invention as will become apparent from the following disclosure.

SUMMARY OF THE INVENTION

In general terms, the instant invention consists of an adsorbent mass comprising a surface-modified cellulosic material having certain organic nitrogen compounds affixed on the surface of said material in such fashion that said nitrogen compounds remain on the surface in substantial quantity when the material is contacted with aqueous media, and a process for preparing same.

DETAILED DESCRIPTION OF THE INVENTION

More specifically, the present invention encompasses an adsorbent mass comprising a water-insoluble cellulosic substrate having an anionic surface of the type hereinafter disclosed to which is chemically affixed (chemisorbed) at least about 0.1 percent, more preferably from about 5 percent to about 30 percent, by weight of substrate, of a compound selected from the group consisting of nitrogen compounds of the formulas

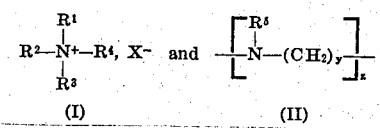

wherein $R^1$ is selected from the group consisting of alkyl and alkanoyl groups containing from about six to about 22 carbon atoms, preferably from about 10 to about 18 carbon atoms, $R^2$ is selected from the group consisting of alkyl and alkanoyl groups containing from about one to about 22 carbon atoms, $R^3$ and $R^4$ are each selected from the group consisting of alkyl and alkanoyl groups containing from about one to about four carbon atoms, X is a member selected from the group consisting of fluoride, chloride, bromide, iodide and hydroxide, $y$ is an integer of from 1 to 4, more preferably 2, $z$ is an integer greater than 1, more preferably about 10 to 10,000, $R^5$ is selected from the group consisting of hydrogen, and alkyl and alkanoyl groups containing from about 1 to about 22 carbon atoms, at least about 5 percent, more preferably from about 20 percent to about 100 percent, of said $R^5$ groups being alkyl or alkanoyl groups containing from about six to about 22 carbon atoms.

In addition, this invention encompasses a process for preparing a water-insoluble adsorptive mass of the type described above comprising: (a) treating cellulosic particles, fibers or fabrics with a reagent which renders the surface thereof anionic; and (b) coating said anionic surface with a nitrogen compound as hereinbefore defined. In this fashion, nitrogenous compounds of formulas (I) and (II) are coated on substrate materials in amounts ranging from about 0.0001 g. to about 1.0 g. of said compound per gram of substrate and remain thereon on contact with water.

In the practice of this invention the surface of a water-insoluble anionic cellulosic substrate is coated with a nitrogen compound of formula (I) or (II) so as to confer useful surface properties on said substrate material. When such nitrogen compounds are merely physically adsorbed or coated on the surface of the cellulosic substrate without pre-treatment they substantially desorb when the substrate comes in contact with water. This is entirely unsatisfactory since most of the useful surface properties of the treated substrate are thereby lost. In the practice of the present invention, however, the nitrogen compounds of formulas (I) and (II) are bonded to the surfaces of the modified cellulosic substrates used herein in such manner that they are not desorbed upon contact with water. This bonding is effected by the strong chemical affinity of the anionic functional groups of the modified cellulosic surfaces for the nitrogen compounds.

As hereinbefore stated, the substrate material utilized in the present invention must be water-insoluble and have anionic functional groups on its surface which are free to chemically react with the nitrogen compound. Few, if any, such materials exist in nature. Hence, it is necessary for the present purposes to modify chemically the surface of a material and to establish the requisite anionic groups thereon. One type of functional group found on the surface of cellulosic materials is the hydroxyl group (OH) and there are a number of processes well-known to those skilled in the art for converting the hydroxylated surfaces of these materials to surfaces having anionic functional groups. Cellulose is a polysaccharide which constitutes the cell membranes of higher plants and can be found in leaves, woody plant structures and especially in cotton fibers, of which it comprises about 98 percent of the total weight. Pure cellulose can be obtained from cotton by dewaxing with an organic solvent and removing pectic substances followed by extraction with a hot 1% sodium hydroxide solution. Cellulosic materials from any of the well-known plant sources can be employed herein. Exemplary cellulosic materials suitable for use herein include cotton, in any of its forms, kapok, purified cotton cellulose, cellulose sponge, and the like. Of course, to serve the purposes of this invention the surface of the cellulose must be chemically modified and anionic groups established thereon prior to coating with the nitrogen compounds of formulas (I) and (II).

As is recognized in the prior art, certain chemical reactions suitable for rendering cellulosic materials anionic result in a concomitant increase of the water solubility of these materials. Therefore, care should be taken in the selection of the chemical reactions used to render the cellulosic surface anionic so as not to increase the water-solubility excessively. Any of the following processes can be satisfactorily employed to render the surface of cellulosic materials anionic and suitable for use herein. One of the most common cellulosic materials, cotton, can be surface-modified and made anionic by any of the hereinafter detailed processes and does not become water-soluble. Cotton is the most preferred cellulosic substrate for general use in the practice of this invention.

Any of the following, well-known chemical reactions can be employed to establish various anionic groups capable of chemisorbing nitrogen compounds of formulas (I) and (II) on the surface of the cellulosic substrate used herein, especially cotton, so that they will not be desorbed from the substrate upon contact with water. For example, cellulose or cotton can be phosphorylated with a solution of urea and phosphoric acid according to the process of Ford and Hall, U.S. Pat. No. 2,482,755, Sept. 27, 1949. Sulfoethylated cotton can be prepared by the process of Hoffpauir and Guthrie, *Textile Research J.*, 20, 617 (1950) by reacting 2-chloroethylsulfonic acid and cotton. Sulfatoethylated cotton can be prepared using 2-chloroethylsulfuric acid in a procedure similar to that used in sulfoethylating cotton. In like manner, phosphatoethylated cotton can be prepared by the use of 2-chloroethylphosphoric acid. The preparation of a partially carboxymethylated cotton by the reaction of chloroacetic acid and cotton fabric is described by Reid, et al., *Textile Research J.*, 18, 551 (1948), and this material is also suitably employed as the water-insoluble anionic substrate used herein. Finally, McIntire, et al., *J. Am. Chem. So.*, 70, 1198 (1947) describe a succinic half ester of cotton cellulose which is prepared by the reaction of cotton and succinic anhydride in dry pyridine, said material also being suitable for use herein. By varying the reaction times and temperatures and concentration of reactants in these prior art processes, substrates having varying percentages of their surface hydroxyl groups converted to anionic groups are prepared. It will be recognized that each of these reactions establishes anionic groups on the surface of the cellulose and these anionic groups are capable of chemically binding nitrogen compounds of formulas (I) and (II), above, and preventing their loss from the coated substrate on contact with water.

It will be recognized that the extent to which the surface hydroxyl groups of the substrate materials are converted to anionic groups of the substrate materials are converted to anionic groups by any of the above methods will depend on such factors as reactant concentrations, reaction temperatures, contact times and the like. These factors are readily manipulated to provide surfaces suitable for use herein on which from about 5 percent to about 100 percent of the hydroxyl groups are converted to the various anionic groups herein detailed. For the purposes of preparing surfaces coated with nitrogen compounds of formulas (I) and (II), cellulosic materials having from about 20 percent to about 100 percent of the surface hydroxyl groups converted to anionic functionalities are preferred. Especially preferred herein are cellulosic materials, especially cotton, having from about 20 percent to about 100 percent of the surface hydroxyl groups phosphorylated.

The nitrogen compounds which are affixed to the anionic cellulosic surface are of two types: (a) the monomeric quaternary ammonium salts of formula (I), above, and (b) the polymeric amines of formula (II), above. The quaternary ammonium compounds of the type encompassed by formula (I) are commercially available materials which are commonly prepared by the reaction of organic amines with alkyl or alkanoyl halides. Quaternary ammonium hydroxides are prepared by reacting quaternary halides with moist silver oxide.

The polymeric amines of formula (II) employed herein to coat the anionic surfaces of cellulosic materials comprise a poly-amine "backbone" having pendant alkyl or alkanoyl groups on the nitrogen atoms. These polymers are difficult to describe in other than a qualitative manner. For example, one of the more useful polyamines used herein is alkylated or alkanoylated polyethylenimine. It is believed that the structural formula of polyethylenimine is:

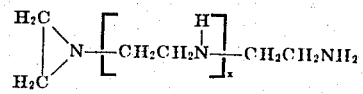

wherein $x$ represents a whole number greater than 1, usually about 2 – 100,000. The degree of polymerization, $x$, is not critical for the purposes of this invention. Branched chains occur along the polymeric backbone and the relative proportions of primary, secondary and tertiary amino groups present in the polymer will vary, depending on the manner of preparation. The distribution of amino groups in a typical polyethylenimine is approximately as follows:

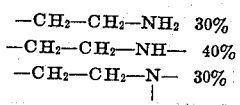

The polyethylenimine can only be characterized in terms of molecular weight. Such polymers can be prepared, for example, by polymerizing ethylenimine in the presence of a catalyst such as carbon dioxide, sodium bisulfite, sulfuric acid, hydrogen peroxide, hydrochloric acid, acetic acid, etc. Specific methods are described in U.S. Pat. Nos. 2,182,306, Ulrich et al., granted Dec. 5, 1939; 3,033,746, Mayle et al., granted May 8, 1962; 2,208,095, Esselmann et al., granted July 16, 1940; 2,806, 839, Crowther, granted Sept. 17, 1957; and 2,553,696, Wilson, granted May 21, 1951.

The alkylated and alkanoylated polyethylenimines are obtained by heating alkyl halides, organic acids or acid halides with the polyethylenimine in the manner described by Ulrich, et al., in U.S. Pat. Nos. 2,296,226 (Sept. 15, 1962), 2,272,489 (Feb. 10, 1942) and 2,185,480 (Jan. 2, 1940), incorporated herein by reference. Various ratios of alkylating or alkanoylating agent to polyamine can be employed so that varying percentages of the nitrogen atoms are thereby substituted. The percentage of nitrogen substitution can be determined, for example, by an examination of the proton resonance or the infrared adsorption of the polymer. The resulting alkylated and alkanoylated poly-amines which have molecular weights in the range of about 1,000 to about 1 million are useful herein. Preferred herein are alkylated and alkanoylated polyamines, especially polyethylenimines, having a molecular weight in the range of about 1,000 – 100,000, wherein about 20 percent of the nitrogen groups are alkylated or alkanoylated.

Following the establishment of the anionic groups on the surface of the cellulose, the nitrogen compound corresponding to formula (I) or (II) is contacted with the anionic surface and thereby affixed thereto: this can be accomplished in a variety of ways. For example, both the liquid and solid nitrogen compounds of formulas (I) and (II) can be physically padded or pressed onto the modified anionic surface of the substrate material. When this procedure is used an excess of nitrogen compound will sometimes be coated on the substrate initially, but this excess can be conveniently removed by rinsing the material with water. Alternatively, compounds having formulas (I) and (II) are quite soluble in various organic solvents such as the lower alcohols, e.g., ethanol and methanol, and can be dissolved therein and the solutions used to affix these compounds on the anionic surface of the modified cellulosic substrate by simply rinsing said substrate in the solution and allowing excess solvent to evaporate. Spraying techniques can also be used. Such solutions are preferred herein for coating the anionic substrates. Optionally, any excess nitrogen compound can be removed by rinsing the coated substrate in water. Still another method for affixing the nitrogen compounds to the modified cellulosic surfaces used herein comprises adsorbing a primary, secondary or tertiary amine or polyamine on the anionic surface, usually from solution in an organic solvent, and then alkylating or alkanoylating the amine or polyamine in situ by contacting with an organic acid or acid halide. Any of these processes results in the establishment of a nitrogen compound of formula (I) or (II) on the anionic surface of the substrate such that it is not removed by contact with water.

The temperature at which the compounds of formulas (I) and (II) are affixed on the surface of the anionic cellulosic material is not critical and any convenient temperature can be used. Most generally, temperatures from about 20° to about 100° C are employed. If an organic solvent is used to pre-dissolve the nitrogen compound, it is convenient to use temperatures below the boiling point of said solvent in the coating process.

In the foregoing manner, anionic, water-insoluble substrates coated with from about 0.0001 g. to about 1.0 g. of the nitrogen compounds of formulas (I) and (II) per gram of substrate are secured. Preferred embodiments of this invention comprise water-insoluble, anionic cellulosic substrates as hereinbefore described on which is chemisorbed (chemically affixed) from about 0.001 to about 0.3 g. of said nitrogen compounds per gram of substrate. Such chemically-affixed nitrogen compounds are not desorbed on contact with water.

The following examples serve to illustrate the kinds of adsorbent masses comprising water-insoluble anionic cellulosic materials coated with organic nitrogen compounds of formulas (I) and (II) encompassed by this invention but are not intended to be limiting thereof. In the examples, the cellulosic substrates, e.g., cellulose and cotton, the nitrogen compounds, and the various acids and alkyl- and alkanoyl halides are commercially available. The terminology used herein, e.g., "100% SPEI", etc., describes the percentage of nitrogen atoms in the polyamines which are substituted with the various alkyl and alkanoyl groups; this can be varied by changing the ratio of alkyl or alkanoyl halide reacted with the polyamines, based on the equivalents of nitrogen in the polymers.

EXAMPLE I

Stearoylated Polyethylenimine on Phosphorylated Cotton

According to the general process of Ford and Hall, U.S. Pat. No. 2,482,755, above, 721 ml. of distilled water and 300 g. of urea were mixed in a 1,500 ml. beaker until all the urea had dissolved. Following this, 279 ml. of phosphoric acid (85 percent) was added to the urea solution and the pH of the resulting solution was adjusted to about 2.0 with hydrochloric acid. The urea-phosphoric acid solution was poured into a stainless steel container and a cotton (terry) cloth about 8 in. square, weighing about 40 g., was dipped into the solution and completely saturated. The cloth was then wrung out and air dried. Following this, the cloth was heated in a gravity convection oven at about 300° F for 30 minutes. The resulting cloth contained approximately 5.3 percent free phosphorus. After curing at 300° F the phosphorylated cotton cloth was quite dark; the cloth was washed for three 10-minute periods in a standard washing machine using a commercial detergent to remove most of the discoloration. Following this, the cloth was dried.

The above procedure was modified in the following way and phosphorylated cotton (terry) cloths were obtained wherein the degree of phosphorylation was somewhat less. The modification consisted of decreasing the 300° F curing time and then washing the cloths. When cotton terry cloths were rinsed in the urea-phosphorus acid solution prepared as above, air dried and then cured at 300° F for 5 minutes prior to washing, the phosphorus content was 1.1 percent; 15 minute curing at 300° F yielded cloths containing about 3.2 percent, by weight, phosphorus. A phosphorus content of about 5.3 percent – 5.6 percent corresponds to 100 percent surface phosphorylation of a cellulosic material.

Stearoylated polyethylenimine (SPEI) having approximately 20 percent of the nitrogen functionalities substituted with stearoyl groups (20 percent SPEI) was prepared by heating a 0.2:1 (mole) mixture of stearoyl chloride and polyethylenimine according to the procedure of Ulrich, U.S. Pat. No. 2,296,226. The polyethylenimine used had an estimated molecular weight of about 20,000. The stearoylated polyethylenimine was applied to the phosphorylated cotton cloths, prepared as above, in a variety of ways. In the first procedure, 3.8 grams of the 20 percent SPEI was dissolved in 200 ml. of 95 percent ethyl alcohol and the phosphorylated cloth was rinsed in this solution and air dried overnight. In a second procedure, the stearoylated polyethylenimine was melted and the phosphorylated cloth was dipped in the melt, passed through a mechanical ringer and air dried. In another process, the stearoylated polyethylenimine was dissolved in ethyl alcohol and brushed onto the surface of the phosphorylated cotton cloth.

Following the application of the 1 20 percent stearoylated polyethylenimine on the phosphorylated cotton cloth, the cloths were washed in water to remove excess stearoylated polyethylenimine and the resulting surface coated cloths were air dried. In this manner a cloth having the following specifications was prepared.

| | % P (By wt. of cloth) | % Phosphorylated | % Adsorbed 20% Stearoylated Polyethylenimine (By wt. of cloth) |
| --- | --- | --- | --- |
| Cotton Terry | 5.3 | ca. 100% | 30% (approx.) |

In the above procedure, the cotton terry cloth is replaced by cotton muslin cloth, dewaxed cellulose fibers, rag paper, and kapok, respectively, and equivalent results are obtained in that these cellulosic materials are phosphorylated and coated with the amine to provide water-insoluble materials having water stable amine coatings.

In the above process, the 20 percent stearoylated polyethylenimine prepared by heating a 0.2:1 mole ratio of stearoyl chloride and polyethylenimine is replaced, respectively, by stearoylated polyethylenimines prepared by heating the following mole ratios of stearoyl chloride to equivalents of nitrogen in polyethylenimine: (a) 1.0 part stearoyl chloride:1 part polyethylenimine (100 percent stearoylated); (b) 0.5 part stearoyl chloride:1 part polyethylenimine (50 percent stearoylated); (c) 0.05 part stearoyl chloride:1 part polyethylenimine (5 percent stearoylated). Equivalent results are obtained in that the phosphorylated surfaces are coated with water stable coatings of 100 percent SPEI, 50 percent SPEI, and 5 percent SPEI, respectively.

In the above process the stearoyl chloride is replaced by an equivalent amount of hexanoyl chloride, octanoyl chloride, decanoyl chloride, dodecanoyl chloride, tetradecanoyl chloride, hexadecanoyl chloride, eicosanoyl chloride, and docosanoyl chloride, respectively, in equivalent amounts and the corresponding alkanoylated polyethylenimines which are 5 percent, 20 percent, 50 percent and 100 percent alkanoylated are obtained. These alkanoylated polyethylenimines are respectively coated on the phosphorylated surfaces by rinsing, brushing and spraying from ethanol and methanol solutions and by a hot dip in a melt of the alkanoyl polyethylenimine, respectively, and water stable surfaces coated from about 0.001 g. to about 1.0 g. of amine per gram of cloth are secured.

In the above process, the polyethylenimine is replaced, respectively, by polypropylenimine, polymethylenimine, and polybutylenimine, each having an average molecular weight in the range of about 500–50,000. The respective polyamines are 20 percent stearoylated by heating with stearoyl chloride (0.2:1 ratio of stearoyl chloride to amine, based on nitrogen atoms). Equivalent results are obtained in that the phosphorylated substrates are coated with the respective stearoylated polyamines which are not desorbed on contact with water.

In the above process, the 20 percent stearoylated polyethylenimine is replaced, respectively by 15 percent stearoylated polypropylenimine having an average molecular weight of 50,000, 25 percent stearoylated polybutylenimine having an average molecular weight of 10,000, 100 percent hexanoylated polymethylenimine having an average molecular weight of 200,000 and 100 percent docosanoylated polyethylenimine having an average molecular weight of about 1 million, and equivalent results are obtained in that the 20 percent phosphorylated, the 60 percent phosphorylated and the 100 percent phosphorylated cotton substrate materials are coated with water stable coatings of the respective amines in amounts from about 0.0001 g. to about 1.0 g. of amine per gram of cloth.

In the above processes, the alkanoyl halides used to prepare the various alkanoylated amines are replaced by the following alkyl halides: hexylchloride, hexylbromide, octylchloride, decylchloride, dodecylbromide, dodecylchloride, tetradecylchloride, hexadecylchloride, hexadecylbromide, octadecylchloride, octadecylbromide, eicosylchloride and docosylchloride, respectively, in equivalent amounts and the corresponding 15 percent, 25 percent, 50 percent and 100 percent alkylated polyalkylenimines, i.e., polyethylenimines, polypropylenimines, polymethylenimines, and polybutylenimines, are secured. These alkylated polyalkylenimines are respectively brushed, rinsed, and sprayed from ethanolic and methanolic solutions onto the 20 percent phosphorylated surfaces, the 60 percent phosphorylated surfaces and the 100 percent phosphorylated surfaces, respectively, and water stable coated with about 20 percent, by weight, of said amines are secured.

In the above procedures, the various alkyl and alkanoyl polyamines are replaced by the following monomeric quaternary ammonium materials, respectively, and surface phosphorylated cellulose coated with said quaternary ammonium materials are thereby secured: docosyldimethylammonium chloride, eicosyldiethylammonium chloride, octadecyltrimethylammonium chloride, hexadecyltriethylammonium bromide, hexadecyltributylammonium chloride, bis-(tetradecyl)dimethylammonium iodide, bis-(dodecyl)dimethylammonium bromide, bis-(docosyl)dimethylammonium hydroxide, dihexyldimethylammonium iodide, octyldimethylethylammonium fluoride, and cetylpyridinium chloride; equivalent results are obtained in that the anionic substrates are coated with from about 0.001 to about 1.0 g. of the respective quaternary ammonium compounds per gram of substrate.

EXAMPLE II

Stearoylated Polyethylenimine on Sulfatoethylated Cotton

According to the general process of Hoffpauir and Guthrie, *Textile Research J.*, 20, 617 (1950), cotton terry fabric is immersed in a solution comprising 25 percent sodium hydroxide, 10 percent 2-chloroethylsulfuric acid and 65 percent water and heated for 45 minutes at about 100° C. The resulting sulfatoethylated cloth is dried and sprayed with a 20 percent (wt.) solution of 20 percent SPEI (avg. mol. wt. 10,000) in ethyl acetate and the coated cloth allowed to dry. Excess 20 percent SPEI is removed by rinsing in ethyl alcohol. In this fashion, from about 0.1 to about 0.3 gram of 20 percent SPEI is chemisorbed per gram of cloth.

In the above procedure, the cotton terry cloth is replaced by cotton muslin cloth, dewaxed cellulose fibers, rag paper, kapok and cellulose sponge, respectively, and equivalent results are obtained in that these cellulosic materials are sulfatoethylated and coated with 20 percent SPEI to provide water-insoluble amine-coated materials which are water stable.

In the above procedure, the stearoylated polyethylenimine is replaced by the following materials, respectively, and surface sulfatoethylated water-insoluble materials having a water stable coating are thereby secured: docosylmethylammonium chloride, hexadecylammonium hydroxide, bis-(docosyl)ammonium chloride, bis-docosyldimethylammonium hydroxide, bis-(tallowalkyl)dimethylammonium chloride, and octadecyldimethylethylammonium fluoride.

In the above process, the 20 percent SPEI is replaced, respectively, by 15 percent stearoylated polypropylenimine having an average molecular weight of 5,000, 25 percent stearoylated polybutylenimine having an average molecular weight of 1 million and 100 percent docosanoylated polypropylenimine having an average molecular weight of 100,000, and equivalent results are obtained in that the sulfatoethylated surfaces are coated with about 0.15 g. of the respective alkanoylated polyamines per gram of substrate.

In the above process, the stearoylated polyethylenimine is replaced by 20 percent hexylated polyethylenimine having an average molecular weight of about 50,000, 5 percent docosylated polyethylenimine having an average molecular weight of about 250,000, 40 percent docosylated polypropylenimine, having and average molecular weight of about 75,000, 75 percent docosanoylated polymethylenimine having an average molecular weight of about 30,000 and 100 percent docosylated polybutylenimine having an average molecular weight of about 500,000, respectively. Water-insoluble substrates having sulfatoethylated surfaces coated with about 30 percent, by weight, of the respective alkyl polyamines stable on contact with water are thereby secured.

In the above process, the 2-chloroethylsulfuric acid is replaced by an equivalent amount of 2-chloroethylphosphoric acid and water-insoluble substrates having phosphatoethylated surfaces are secured. The phosphatoethylated materials are coated with the respective alkyl and alkanoyl nitrogen compounds (about 25 percent, by weight); the surface coatings are stable on contact with water.

In the above process, the 2-chloroethylsulfuric acid is replaced by an equivalent amount of 2-chloroethylsulfonic acid and equivalent results are obtained in that water-insoluble cotton fabrics and fibers having sulfoethylated surfaces are secured. These sulfoethylated surfaces are coated with the respective nitrogen compounds noted above and materials having a water stable surface coated with from about 0.1 to about 0.5 g. of amine per gram of substrate are thereby secured.

EXAMPLE III

Stearoylated Polyethylenimine on Carboxymethylated Cotton

According to the general procedure of Reid, et al., *Textile Research J.*, 18, 551 (1948), cotton terry fabric is partially carboxymethylated by wetting with a 40 percent aqueous solution of monochloroacetic acid and dried. Following this treatment the carboxymethylated cotton terry is coated with about 0.15 g. of 20 percent SPEI (mol. wt. of the 20 percent SPEI in the range of about 1,000–440,000) per gram of fabric by immersing the carboxymethylated terry in a 10 percent (wt.) solution of the 20 percent SPEI in 90 percent methyl alcohol. Following this treatment the cloth is wrung to remove excess SPEI solution and the cloth allowed to dry.

In a modification of the above procedure, the cotton terry is replaced, respectively, by cotton batting, cellulose sponge, and kapok and equivalent results are secured in that these water-insoluble materials are carboxymethylated and coated with similar quantities of the 20 percent SPEI which is not desorbed in contact with water.

In the above process, the 20 percent SPEI is replaced, respectively, by 50 percent stearoylated polymethylenimine having an average molecular weight of 15,000, 25 percent stearoylated polybutylenimine having an average molecular weight of 100,000 and 100 percent docosanoylated polypropylenimine having an average molecular weight of 150,000, respectively, and equivalent results are obtained in that the carboxymethylated surface is coated with from about 0.01 percent (wt.) to 30 percent (wt.) of the respective polyamines.

In the above process, the 20 percent SPEI is replaced by 25 percent hexylated polypropylenimine having an average molecular weight of 1,000, 75 percent docosylated polybutylenimine having an average molecular weight of 25,000, and 100 percent docosylated polymethylenimine having an average molecular weight of 1,500, respectively. Water-insoluble substrates having carboxymethylated surfaces coated with the respective alkyl polyamines stable on contact with water are thereby secured.

In a modification of the above process, cellulose fibers are carboxymethylated with 40 percent aqueous monochloroacetic acid and coated by immersion in a 10 percent solution of 100 percent SPEI in 90 percent methyl alcohol. The cellulose fibers are compacted into a pad containing 5 percent (wt.) of the amine and retained in this configuration by means of thread wrappings.

EXAMPLE IV

Stearoylated Polyethylenimine on Succinated Cotton

According to the general procedure of McIntire, et al., *J. Am. Chem. Soc.*, 70, 1193 (1947), cotton terry is refluxed with a 10 percent (wt.) solution of succinic anhydride in dry pyridine for 26 hours, washed and allowed to dry. The resulting succinated cotton material is coated with 20 percent SPEI (average molecular weight 20,000) by brushing a 25 percent solution of 20 percent SPEI in dry pyridine onto the surface. After drying, the coated fabric is rinsed in 50 percent methanol-50 percent water, wrung in a mechanical wringer and dried under forced air heat at 100° C.

In the above procedure the cotton terry is replaced by cotton muslin, cellulose fibers and wood pulp, respectively. The polyhydroxylic surfaces of these materials are succinated and coated with from about 0.01 g. to 1 g. of the 20 percent SPEI per gram of substrate in such fashion that it is not desorbed on contact with water.

In the above process the 20 percent stearoylated polyethylenimine is replaced by 20 percent stearoylated di-ethylenimine, 100 percent stearoylated tri-ethylenimine, 50 percent stearoylated octaethylenimine, 5 percent stearoylated di-propylenimine, 50 percent docosylated di-butylenimine and 100 percent stearoylated polyethylenimine having a degree of polymerization of about 10,000 units, and equivalent results are obtained in that the succinated surfaces are coated with the various polyamines in equivalent amounts and in such fashion that they are not desorbed on contact with water.

In the above process, the 20 percent SPEI is replaced by an alkanoylated polyethylenimine having a degree of polymerization in the range from about 10 to about 1,000, prepared by heating stearoyl chloride and polyethylenimine in a mole ratio of 0.1 moles of stearoyl chloride per mole equivalent of nitrogen in the polyethylenimine to secure 10 percent stearoylated polyethylenimine and subsequently heating this 10 percent stearoylated polyethylenimine with methyl chloride such that the remaining 90 percent of the nitrogen groups are substituted with methyl groups. The resulting 10 percent stearoylated – 90 percent methylated polyethylenimine is sprayed onto the surface of the succinated cotton in an alcoholic solution and remains affixed thereto when the substrate is in contact with water.

In the above process, the 20 percent SPEI is replaced by docosanoyltrimethylammonium chloride, hexanoyl-docosanoyl diethylammonium bromide, dihexanoyl-dimethanoylammonium hydroxide, bis-(docosanoyl)-ammonium fluoride, tris-(hexanoyl)-methylammonium iodide and cetyl-trimethanoylammonium bromide and water stable amine-coated substrates coated with from 0.05 percent to 100 percent by wt. of amine, based on weight of substrate, are secured.

What is claimed is:

1. An adsorbent mass comprising a water-insoluble cellulosic substrate having an anionic surface on which is chemisorbed at least about 0.1 percent, by weight, of a nitrogen compound having the formula

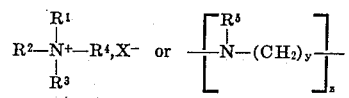

wherein $R^1$ is selected from the group consisting of alkyl and alkanoyl groups containing from about 6 to about 22 carbon atoms, $R^2$ is selected from the group consisting of alkyl and alkanoyl groups containing from about one to about 22 carbon atoms, $R^3$ and $R^4$ are each selected from the group consisting of alkyl and alkanoyl groups containing from about one to about four carbon atoms, X is a member selected from the group consisting of fluoride, chloride, bromide, iodide and hydroxide, $y$ is an integer of from 1 to 4, $z$ is an integer greater than 1, $R^5$ is selected from the group consisting of hydrogen, and alkyl and alkanoyl groups containing from about one to about 22 carbon atoms, at least about 5 percent of said $R^5$ groups being alkyl or alkanoyl groups containing from about six to about 22 carbon atoms.

2. An adsorbent mass according to claim 1 wherein the water-insoluble cellulosic substrate having an anionic surface is phosphorylated cotton.

3. An adsorbent mass according to claim 1 wherein the water-insoluble cellulosic substrate having an anionic surface is sulfatoethylated cotton.

4. An adsorbent mass according to claim 1 wherein the water-insoluble cellulosic substrate having an anionic surface is sulfoethylated cotton.

5. An adsorbent mass according to claim 1 wherein the water-insoluble cellulosic substrate having an anionic surface is phosphatoethylated cotton.

6. An adsorbent mass according to claim 1 wherein the water-insoluble cellulosic substrate having an anionic surface is carboxymethylated cotton.

7. An adsorbent mass according to claim 1 wherein the water-insoluble cellulosic substrate having an anionic surface is succinated cotton.

8. An adsorbent mass according to claim 1 comprising cotton having a surface which is from about 20 percent to about 100 percent phosphorylated on which is chemically affixed from about 0.1 percent to about 30 percent, by weight, of a member selected from the group consisting of nitrogen compounds of the formulas

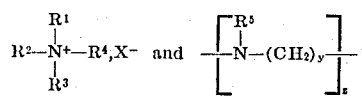

wherein $R^1$ is selected from the group consisting of alkyl and alkanoyl groups containing from about six to about 22 carbon atoms, $R^2$ is selected from the group consisting of alkyl and alkanoyl groups containing from about one to about 22 carbon atoms, $R^3$ and $R^4$ are each selected from the group consisting of alkyl and alkanoyl groups containing from about one to about four carbon atoms, X is a member selected from the group consisting of fluoride, chloride, bromide, iodide and hydroxide, y is an integer of from 1 to 4, z is an integer greater than 1, $R^5$ is selected from the group consisting of hydrogen, and alkyl and alkanoyl groups containing from about six to about 22 carbon atoms, at least 5 percent of said $R^5$ groups being alkyl or alkanoyl groups containing from about six to about 22 carbon atoms.

9. An adsorbent mass according to claim 8 wherein the substrate material is cotton which is from about 20 percent to about 100 percent phosphorylated and wherein the nitrogen compound chemically affixed to the surface thereof is polyethylenimine having from about 20 percent to about 100 percent of the nitrogen atoms stearoylated.

10. A process for preparing an adsorbent mass comprising the steps of: (1) treating a water-insoluble cellulosic substrate with a reagent which renders the surface of said substrate anionic; and (2) contacting said anionic substrate prepared in step (1) with a member selected from the group consisting of nitrogen compounds of the formulas

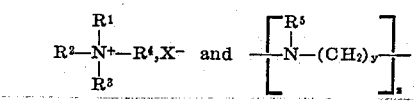

wherein $R^1$ is selected from the group consisting of alkyl and alkanoyl groups containing from about six to about 22 carbon atoms, $R^2$ is selected from the group consisting of alkyl and alkanoyl groups containing from about 1 to about 22 carbon atoms, $R^3$ and $R^4$ are each selected from the group consisting of alkyl and alkanoyl groups containing from about one to about four carbon atoms, X is a member selected from the group consisting of fluoride, chloride, bromide, iodide and hydroxide, y is an integer of from 1 to 4, z is an integer greater than 1, $R^5$ is selected from the group consisting of hydrogen, and alkyl and alkanoyl groups containing from about six to about 22 carbon atoms, at least 5 percent of said $R^5$ groups being alkyl or alkanoyl groups containing from about six to about 22 carbon atoms.

11. A process according to claim 10 wherein the reagent for rendering the cellulosic substrate anionic is a member selected from the group consisting of 2-chloroethylsulfuric acid, 2-chloroethylsulfonic acid, 2-chloroethylphosphoric acid, chloromethylacetic acid, succinic anhydride and phosphoric acid.

12. A process according to claim 10 wherein the cellulosic substrate is cotton.

* * * * *